United States Patent [19]

Braff

[11] Patent Number: 5,006,855
[45] Date of Patent: Apr. 9, 1991

[54] RANGING AND PROCESSING SYSTEM FOR MOBILE SURVEILLANCE AND DATA LINK

[75] Inventor: Ronald Braff, Annandale, Va.

[73] Assignee: The Mitre Corporation, Bedford, Mass.

[21] Appl. No.: 274,643

[22] Filed: Nov. 17, 1988

Related U.S. Application Data

[63] Continuation of Ser. No. 898,196, Aug. 20, 1986, abandoned.

[51] Int. Cl.[5] .............................................. H04B 7/185
[52] U.S. Cl. .................................... 342/357; 342/352; 364/423
[58] Field of Search ............... 342/451, 352, 357, 356, 342/387, 453, 465, 457; 364/423, 451, 459; 455/12, 13

[56] References Cited

U.S. PATENT DOCUMENTS

| | | | |
|---|---|---|---|
| 3,497,807 | 2/1970 | Newton | 342/357 X |
| 3,544,995 | 12/1970 | Bottenberg | 342/357 X |
| 3,879,581 | 4/1975 | Schlosser et al. | 455/12 X |
| 4,161,734 | 7/1979 | Anderson | 342/352 |
| 4,445,118 | 4/1984 | Taylor et al. | 342/357 |
| 4,613,864 | 9/1986 | Hofgen | 342/357 |
| 4,647,932 | 3/1987 | One et al. | 342/461 |

FOREIGN PATENT DOCUMENTS 8201076  4/1982  PCT Int'l Appl. ................. 342/357

OTHER PUBLICATIONS

"The on Board Computer for the IRAS Satellite"; JA Van Stuyvenberg; Journal; of the Interplanetary Society; vol. 32, No. 2, pp. 43–47, 1979.

Primary Examiner—Thomas H. Tarcza
Assistant Examiner—Tod R. Swann
Attorney, Agent, or Firm—Wolf, Greenfield & Sacks, P.C.

[57] ABSTRACT

The satellite system includes at least two satellites having on-board processing capability so that data messages may be exchanged and the position of mobiles may be determined with direct access from multiple ground control facilities. The satellites transmit data and poll individual mobiles upon command by one or more of the control facilities and receive replies from the mobiles including the mobiles' altitude and other data of interest to the control facility. The at least two satellites communicate with one another by means of a cross-link communication path. Computer processing apparatus is included on the satellites to compute the ranges between the mobiles and each of the satellites from the replies received from the mobiles, and to store and process messages. The position information and messages are transmitted to at least one of the control facilities. It is preferred that the control facilities employ TDMA or FDMA protocols in the uplinks to the satellites. The on-board processing makes it readily possible for a number of control facilities to gain access to the satellites directly rather than through a central earth station, and to increase the capacity of a discrete address polling system for a given allocation of radio frequency spectrum. A discrete address polling system is one where each mobile is polled on an individual basis by only responding to polls that contain its identification.

7 Claims, 8 Drawing Sheets

RANGING AND PROCESSING SYSTEM FOR MOBILE SURVEILLANCE AND DATA LINK

This application is a continuation, of U.S. application Ser. No. 06/898,196, filed 08/20/86 now abandoned.

BACKGROUND OF THE INVENTION

The present invention relates to a satellite surveillance and data link system and more particularly to a system for determining the range to mobiles, storing uploaded poll commands to mobiles until the poll is scheduled to be transmitted, and aquiring mobiles that request entry into the system through satellite on-board computing capability.

There is currently high-level commercial and government interest in the application of communication satellite technology to mobiles (e.g., aircraft, ships, and trucks). This technology has the advantage of almost unlimited coverage as compared to the restrictions of terrestrial line-of-sight limited communications and it eliminates the need for many ground-based facilities. There is also unused radio spectrum reserved for mobile-satellite communications. Satellites have been in successful operation for ship-to-shore communications for several years through a service provided by the international consortium, INMARSAT. Recently, the aviation community has rapidly begun to renew its interest for the use of satellites for air traffic control, airline operational control and public correspondence.

In known polling system methods using satellites for cooperative position determination, the satellite acts only as a repeater for ground initiated polls and replies from the mobile, and acts as a repeater for data messages. U.S. Pat. No. 4,359,733 discloses a GEOSTAR concept that utilizes satellites as repeaters in which ground based computers calculate ranges to mobiles.

Other known proposed systems also use the satellite solely as a repeater of the uplinked data from the ground, and rely upon centralized earth stations and terrestrial links for interconnection to control facilities such as air traffic control centers. On-board processing is a major theme of NASA's Advanced Communication Technology Satellite (ACTS) program and advanced military satellites. See, M. Kachnor, "Switchboards in the Sky," *Microwave and RF*, June, 1986, and M. E. Thimlar, et al., "Future Space-Based Computer Processors," Aerospace America, March 1984.

It is therefore an object of the present invention to provide a ranging and processing satellite system for cooperative mobile surveillance and data link service in which the satellites have on-board processing capability.

It is another object of the present invention to provide such a satellite system which can be directly accessed from multiple ground control facilities.

Yet another object of the invention is such a satellite-based system which is more efficient than previously known discrete address cooperative surveillance satellite systems.

Still another object of the invention is a satellite system including the use of cross-link communications between the satellites to provide data for on-board satellite position determination for on-board acquisition of mobiles into the system.

Yet another object of the invention is a system in which the on-board processing involves not only signal regeneration and beam switching capability, but also digital data processing of messages, for storage of poll commands, generation of polls to mobiles according to a schedule, storage of replies to polls, and formatting of messages.

SUMMARY OF THE INVENTION

These and other objects of the invention are achieved by means of a ranging and processing satellite system (RAPSAT) for data communication and surveillance of mobiles from multiple control facilities including at least two satellites adapted for polling individual mobiles requested by one or more of the control facilities and for receiving replies from the mobiles including the mobiles' altitude such as an aircraft's barometric altitude. A cross-link communication path is provided between the satellites. The satellites include processing apparatus to compute the ranges between the mobile and each of the satellites from the replies from the mobiles and include apparatus for transmitting the computed ranges to at least one control facility, and to compute the mobile's position for acquisition. It is preferred that the control facilities employ TDMA (time division multiple access) or FDMA (frequency division multiple access) as uplinks to the satellites.

BRIEF DESCRIPTION OF THE DRAWING

The invention disclosed herein may be understood better with reference to the drawing of which.

DESCRIPTION OF THE PREFERRED EMBODIMENT

Figure 1:
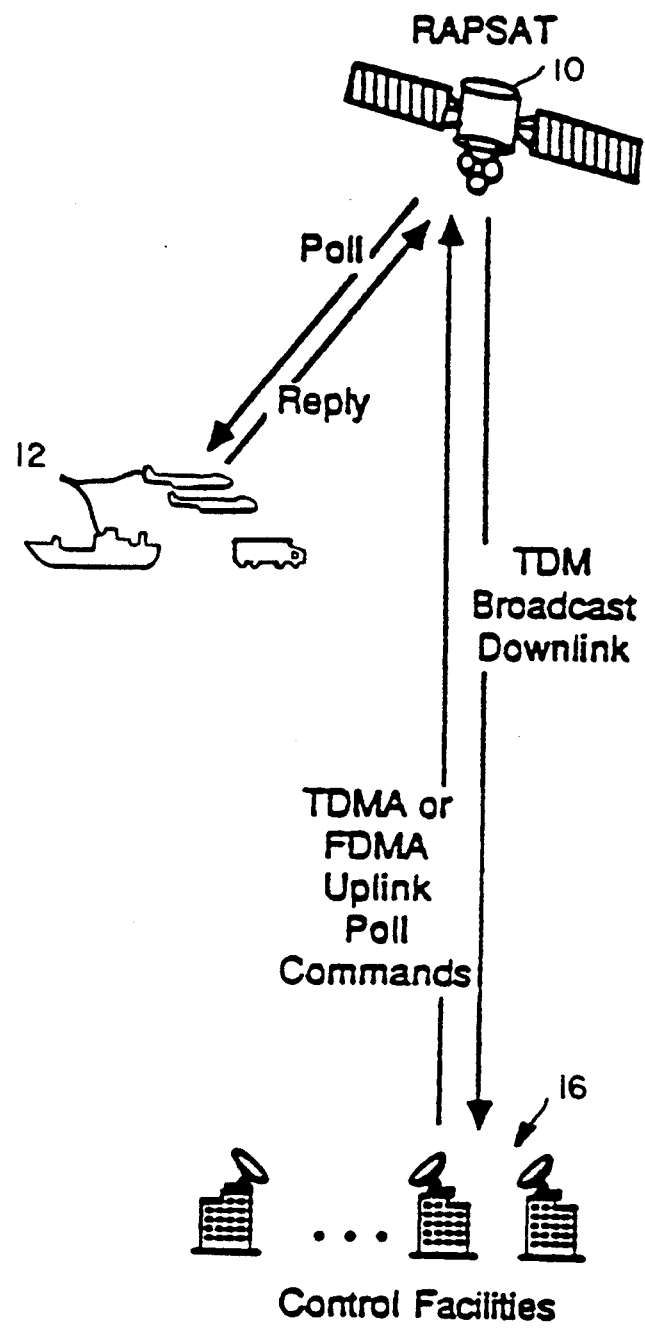
FIG. 1 is a schematic illustration of the RAPSAT external data flow.

The ranging and processing satellite system (RAPSAT) has been designed to provide multiple access for both mobile users and their control facilities such as those operated by air traffic control, marine traffic regulation, and commercial transportation companies. As discussed above, in proposed mobile satellite systems, the ground control facilities obtain access to the satellite via terrestrial links to large central earth stations. However, the on-board processing of the present invention makes it readily possible for a number of control facilities to gain access to the satellite directly from their premises via TDMA or FDMA uplinks as illustrated in FIG. 1. A RAPSAT satellite 10 includes an on-board processor which provides the logic and memory functions to be described hereinafter. Mobile multiple access is accomplished through a polling scheme that is initiated at the satellite 10 under the control of on-board processing based on poll commands from control facilities. The replies from mobiles 12 to the polls from the satellite 10 are processed on-board the satellite 10 including the two-way range determination to the mobile. The resulting data is transmitted via a time division multiplex (TDM) down link broadcast to control facilities 16. Each of the control facilities 16 picks off the data corresponding to the mobiles under its control.

Figure 2:
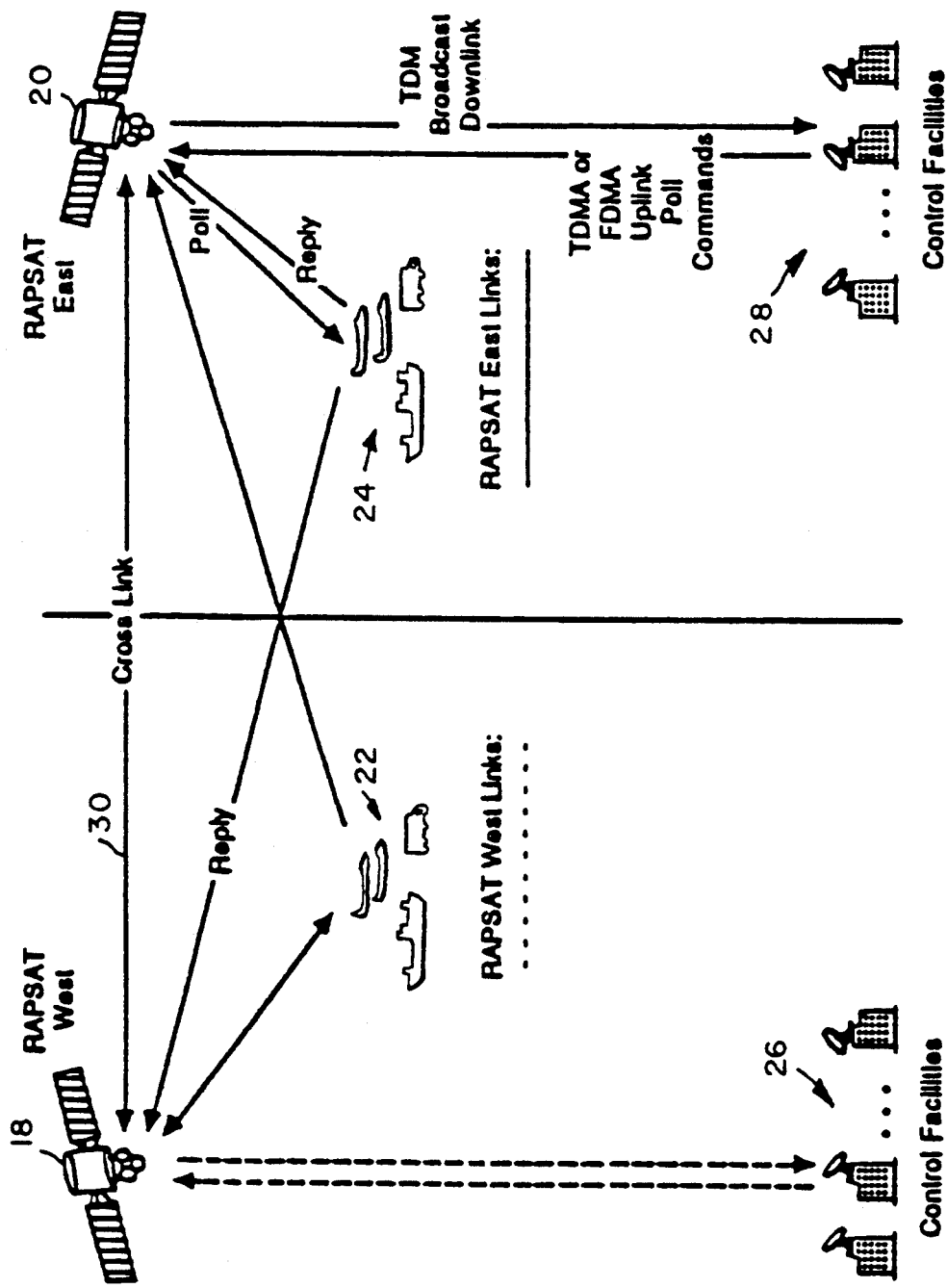
FIG. 2 is a diagram of the overall RAPSAT system architecture employing two geostationary satellites as an example.

FIG. 2 is an overall diagram of the RAPSAT system architecture employing, as an example, two geostationary satellites 18 and 20, each handling one-half of the mobiles 22 and 24. The two satellites 18 and 20 are used for the purposes of sharing the processing load and for mobile position determination by range-range measurements and transmitted altitude from a mobile's reply to a poll that is addressed to it. Each of the satellites 18 and 20 individually polls those mobiles that are under the control of the control facilities 26 and 28 that have access to it. The replies to the polls are received by both satellites for position determination. In the example illustrated in FIG. 2, the satellite 20 transmits a poll to a mobile 24 with a reply being received both by the polling satellite 20 and the receive only satellite 18. The receive only satellite 18 transmits the time it received the reply to the poll originating satellite 20 by a crosslink communication path 30 for processing by the satellite 20 and eventual transmission to the ground control facilities 28.

Each satellite 18 and 20 simultaneously uses the same frequency spectrum; thus, a two-fold frequency reuse is employed for spectral efficiency. This is accomplished by spot beam technology. Furthermore, the coverage of each satellite is partitioned into two areas for the purpose of filling the garbling guard times that must be placed between individual polls from the satellite when operating in a multi-satellite ranging mode. Garbling refers to an interfering overlap of replies at a received satellite. See, B. D. Elrod, "Aircraft Interrogation Scheduling with ASTRO-DABS," Mitre Technical Report, MTR-6368, Mar. 30, 1973. The filling of the garbling guard time—made readily possible by on-board processing—gives RAPSAT almost twice the capacity of previously proposed discrete address polling type satellite systems. See, B. D. Elrod, A. Weinburg, L. P. Sinha, "Investigation of Selected Satellite-Aided ATC System Concepts Employing the NAVSTAR Global Positioning System," Mitre Technical Report, MTR-7688, January 1978.

Figure 3A:
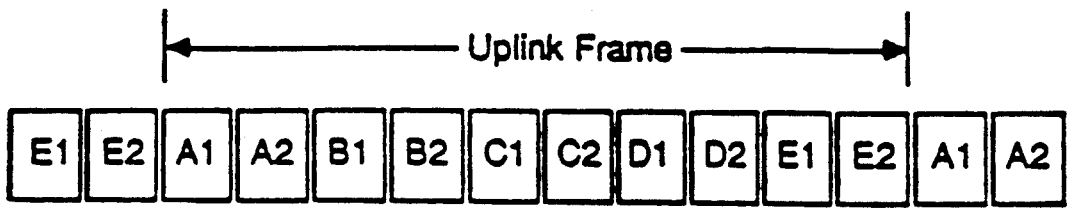
FIG. 3a illustrates an upload of poll commands from ten control facilities to a RAPSAT satellite.
Figure 3B:
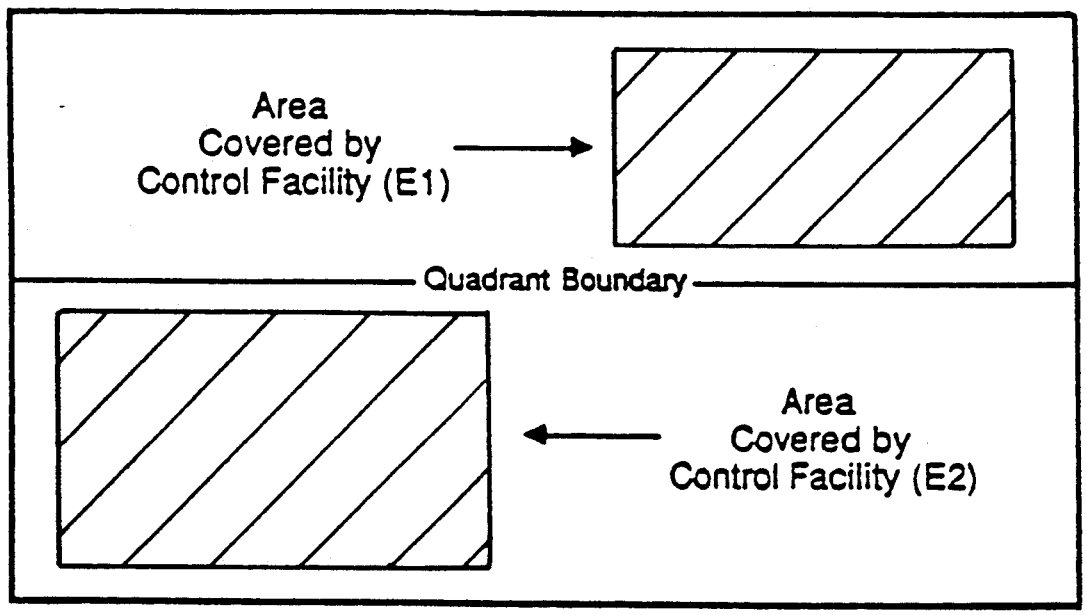
FIG. 3b illustrates the geographical coverage area of a pair of control facilities.

The RAPSAT system disclosed herein is designed such that a number of control facilities such as 26 and 28 can each directly access a satellite from earth stations located on their premises. Mobiles such as 22 and 24 achieve access for data link and surveillance service through replying to periodic polls addressed to them from the satellites 18 or 20 that have been previously uploaded by the control facilities 26 or 28 and stored on board the satellite in a computer. The methods of access will now be described in conjunction with FIGS. 3, 4, and 5. The multiple access for the ground-based control facilities to the RAPSAT satellite can be accomplished either by TDMA or FDMA. It is believed that TDMA is superior for RAPSAT since the time division poll command uploads can be synchronized with the forward link polling sequence as will be discussed below. FIG. 3a illustrates the TDMA upload of poll commands from ten control facilities to one of the satellites 18 or 20 of FIG. 2. The control facility uploads in FIG. 3a are labeled as the five pairs (A1, A2), (B1, B2), (C1, C2), (D1, D2), and (E1, E2). Each control facility is assigned a geographical area of responsibility and loads its poll commands into the uplink channel during its assigned time slot. Since ten control facilities are assumed in this example, ten time slots are allocated each frame. If frame duration is assumed to be four seconds, then each time slot is approximately 0.4 seconds. Each satellite's coverage area is divided in half. Thus, RAPSAT, as illustrated in this example, consists of four major coverage sub-areas or two quadrants per satellite. Each member of a pair of control facilities (say E1, E2) is assigned a geographical coverage area within a different quadrant as illustrated in FIG. 3b. The geographical areas are sufficiently separated such that poll replies from each area can be readily separated by spot beam receive antennas on the satellite. The order of the uplink poll command loading time sequence is synchronized to the order of polling of the area covered by each control facility in a pair as will be shown hereinbelow.

Figure 4A:
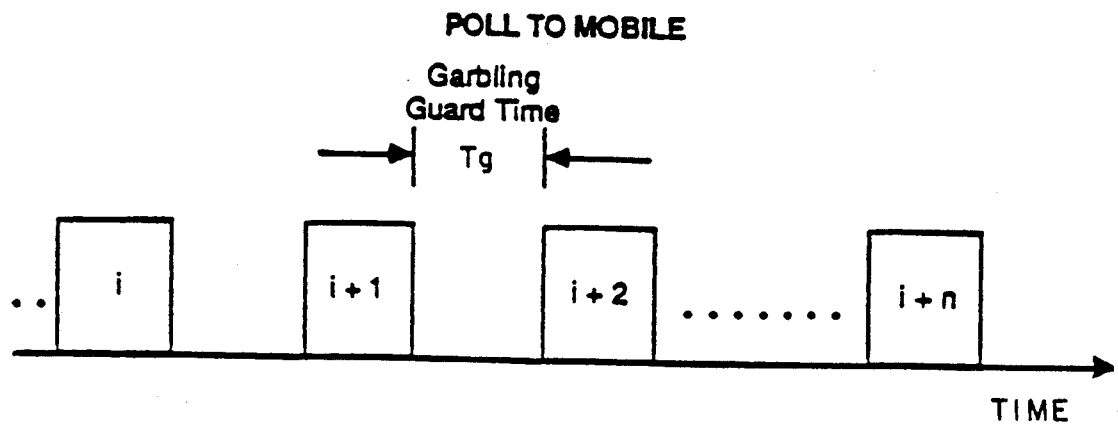
FIG. 4a illustrates a prior art polling sequence.
Figure 5:
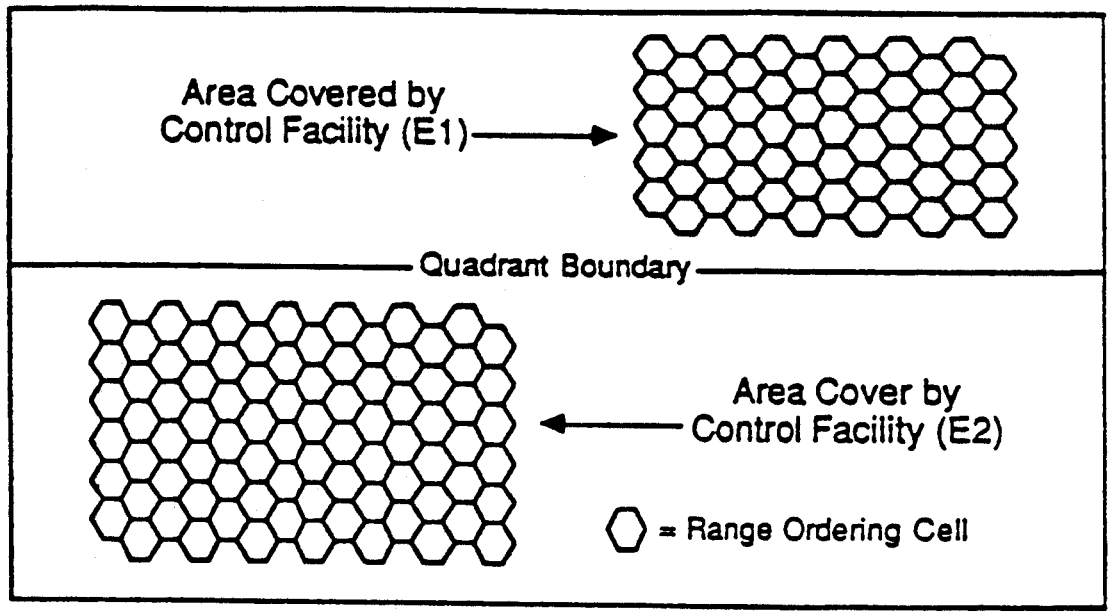
FIG. 5 illustrates the multiple access system of the present invention.

The multiple access of mobiles is designed to account for the guard time that should be inserted between polls to prevent garbling of replies when the poll replies are to be received by more than one satellite. If the polls are to be received by only one satellite, then garbling can be precluded by polling the mobiles in range ascending order from the satellite, and using a guard time between polls if a reply burst from a mobile is of greater duration than the next poll burst transmitted from the satellite. B. D. Elrod in the 1973 report referenced above has shown that garbling can also be precluded when replies are to be received by more than one satellite if the guard time satisfies the following inequality $$T_g > D/c + T_{rl} - T_{t2}$$

where
$T_g$ = guard time between polls
$D$ = distance between the two mobiles
$c$ = speed of light
$T_{rl}$ = burst duration of reply to first poll
$T_{t2}$ = burst duration of the next poll transmission To readily implement such a scheme, Elrod divided the coverage area of the polling satellite into solid hexagonal cells of three-dimensional diameter d. Here, these cells will be called range ordering cells (ROC) or range ordering subvolumes to emphasize that they are different from the common frequency reuse cells used in mobile telephone systems. To preclude garbling, mobiles located in each ROC are polled in range ascending order with guard time, $T_g$, between polls and at D=d. This polling sequence is illustrated in FIG. 4a. As can be seen, the guard time $T_g$ is wasted since it is unused.

Figure 4B:
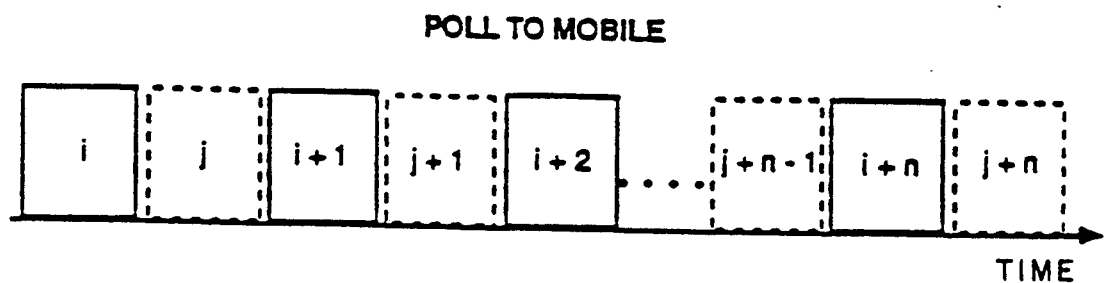
FIG. 4b illustrates the polling sequence disclosed herein.

With on-board processing, it is readily possible to fill the garbling guard time using the same frequency by polling another mobile located in an ROC that is out of the coverage of the receive spot beam antenna that covers the ROC of the first mobile. Thus, the forward link can be fully utilized if mobiles are alternately polled as illustrated in FIG. 4b. In the present invention, mobiles from a pair of control facilities are alternately polled by the on-board processor which has the poll commands stored in its memory. For example, referring to FIG. 5, a mobile under Control Facility (E1) is polled, the next poll is for a mobile under control facility (E2), then a mobile under Control Facility (E1) and so on. It is noted that each control facility pair occupies the two uplink time slots occurring prior to the alternating polling of their respective coverage areas. That is, control facilities (A1) and (A2) start their uplink slots every 4 seconds and complete them just prior to the alternating polling of their coverage areas. This allows the controlling authority on the ground the maximum amount of time (about 3 seconds for this example) to prepare and send an advisory or request data link message during the next poll.

On-board processing allows the range from satellite to mobile to be determined at the satellite. When a mobile is polled, the on-board processor records the time the poll is transmitted. The time when the reply to the poll is received is also determined to derive range to the mobile as is done in conventional radar systems. That is, the total round trip time is an indication of rang from the mobile to the satellite.

To determine a mobile's position, it is sufficient to determine its range to two widely separated satellites and to know its geocentric altitude. The intersection of the resulting three spherical surfaces defines the mobile's position. Aircraft geocentric altitude can be estimated from the sum of transmitted baroaltimeter derived altitude with proper corrections applied to it and the local earth radius. The system of the present invention derives a cooperative position determination by this method for the surveillance function. Referring again to FIG. 2, a reply to a satellite's poll is received at both satellites 18 and 20. The time the mobile 24 transmitted the reply can be calculated at the polling satellite 20 to be $$T_m = (T_{xa} + T_{ra})/2$$

where $T_m$ = time when mobile replies to poll
$T_{xa}$ = time when polling satellite initiates poll to mobile
$T_{ra}$ = time when mobile's reply is received at the polling satellite The range (in units of time) between the second satellite and the mobile is then $$R_b = T_{rb} - T_m$$

where $R_b$ = range to second satellite
$T_{rb}$ = time when mobile's reply is received at second satellite The second satellite 18 transmits its poll received time ($T_{rb}$) to the polling satellite 20 via the cross link 30. The clocks on both satellites are synchronized; therefore, the polling satellite uses the above equations to calculate the range between the second satellite and the mobile. The two ranges and received altitude (in the case of an aircraft) become part of the mobile's down link message to the control facility and are used on-board the satellite to compute position for acquisition of mobiles entering the system. Garbling between replies to polls initiated by both satellites is precluded by directional receive antennas on the satellites.

The acquisition of mobiles according to the present invention can also be accomplished by on-board processing. Periodically, say every two seconds, a broadcast message is transmitted by the satellite for the purpose of requesting acquisition. Those mobiles seeking acquisition will reply. Based on a mobile's reply (including altitude for the case of an aircraft), the polling satellite can calculate the mobile's position as described above, and, thus, identify the ROC where the mobile is located. During the next sweep of this ROC, the mobile is polled. Its reply is then processed as any other reply. The efficiency of this method is decreased by the absence of garbling protection. However, if the acquisition reply message length is kept at a minimum (e.g., identification, range code and abbreviated position information from the mobile navigation system) then the probability of garbling is minimized.

Figure 6:
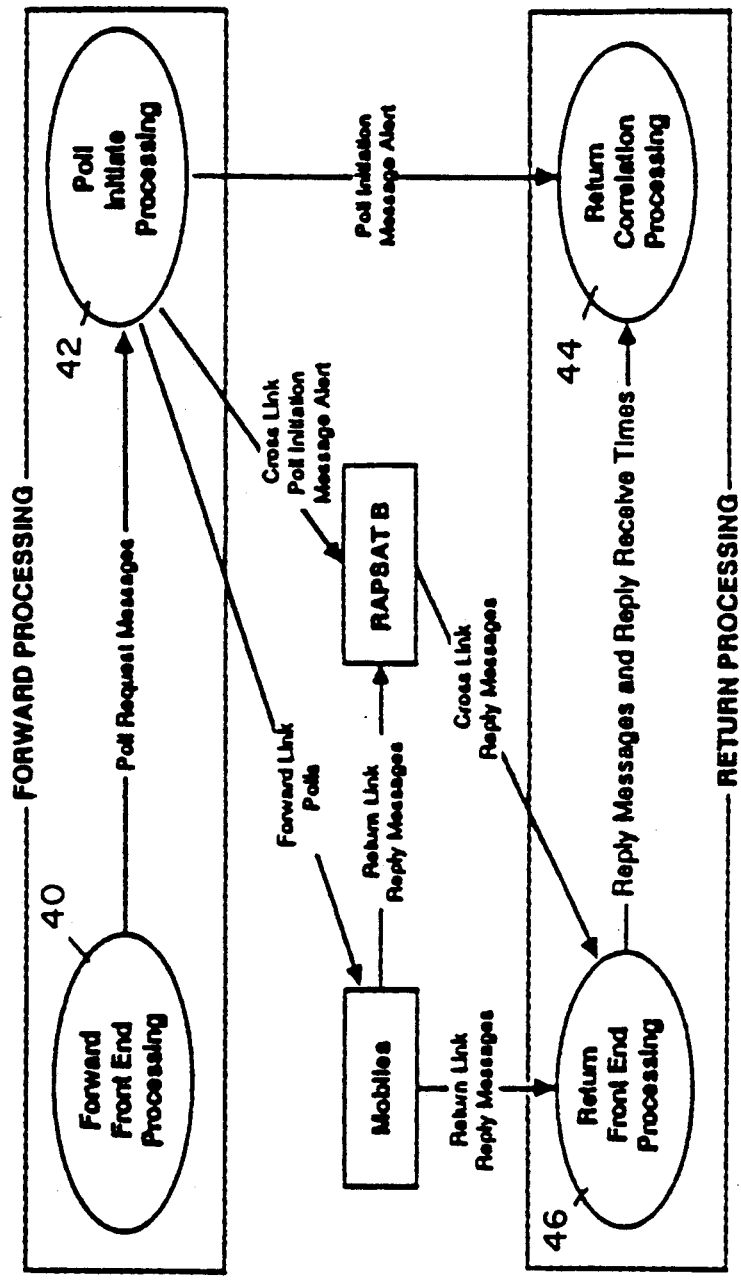
FIG. 6 is an illustrative diagram of the RAPSAT on-board processing top-level data flow.

The RAPSAT concept according to the present invention centers around the use of large scale on-board processing. The operational on-board processing features of RAPSAT are:

Storage of Poll Commands On Board the Satellite to Facilitate Optimal Poll Sequencing
Control Facility Multiple Access
Range Ordered Polling with No Waste of Garbling Guard Times
Two-Way Ranging on Mobiles
Determination of Position of Mobiles
Acquisition of Mobiles Entering the System
Beam Switching
Data Message Regeneration A top-level description of the functions within the satellite to provide these features will now be presented. It is to be understood that this description is only one of a number of ways of implementation. FIG. 6 is a top-level data flow chart of RAPSAT on-board processing. The processing is divided into forward processing and return processing. The forward front end processing block 40 scans a poll request buffer for decoded poll request messages from the control facilities, checks the messages for completeness and consistency, and controls the message flow to the poll initiate processing block 42 to ensure that the poll request messages from a control facility reach the poll initiate processing block 42 in time for the scan of the control facility's coverage area. The poll initiate processing block 42 interprets the poll request messages from the control facilities and formats them into poll messages to the mobiles, controls the scanning of the coverage area of each control facility by controlling the switching to the corresponding spot beam, properly assigns the order of the polls as directed by the stored control facility poll commands, and interleaves the polls of each control facility pair. It interfaces with the cross link channel to alert the other satellite that a poll has been initiated and it transfers the poll initiation alert and poll initiation time to the return correlation processing block 44. A return front end processing block 46 scans the poll reply buffer for decoded replies from mobiles, associates replies with their receive times, checks replies for completeness and consistency, and controls the reply flow to the return correlation processing block 44. It detects and counters external interfering signals in the return link by identifying and evaluating the interference, initiating an alert message to satellite ground control for action, attempts to reject the interference through signal processing or, if necessary, closes the beam through which the interference is present. It also similarly processes buffered decoded reply data received from the other satellite.

The return correlation processing block 44 correlates a reply message to the corresponding poll initiation message, pairs the poll initiation time and poll receive times at its satellite and at the other satellite for range determination, performs the two-way ranging computations for each satellite, formats each reply message for the down link, performs the acquisition function, and formats and controls the down link TDM stream of reply messages.

The forward functions (ground to mobile) of the satellite receive and process the poll request messages from the control facilities and initiate the polls. The return functions (mobile to ground) receive and process the replies from the mobiles, correlate them with the poll initiations, determine range to the mobile, and generate the TDM down link to the control facilities.

Figure 7:
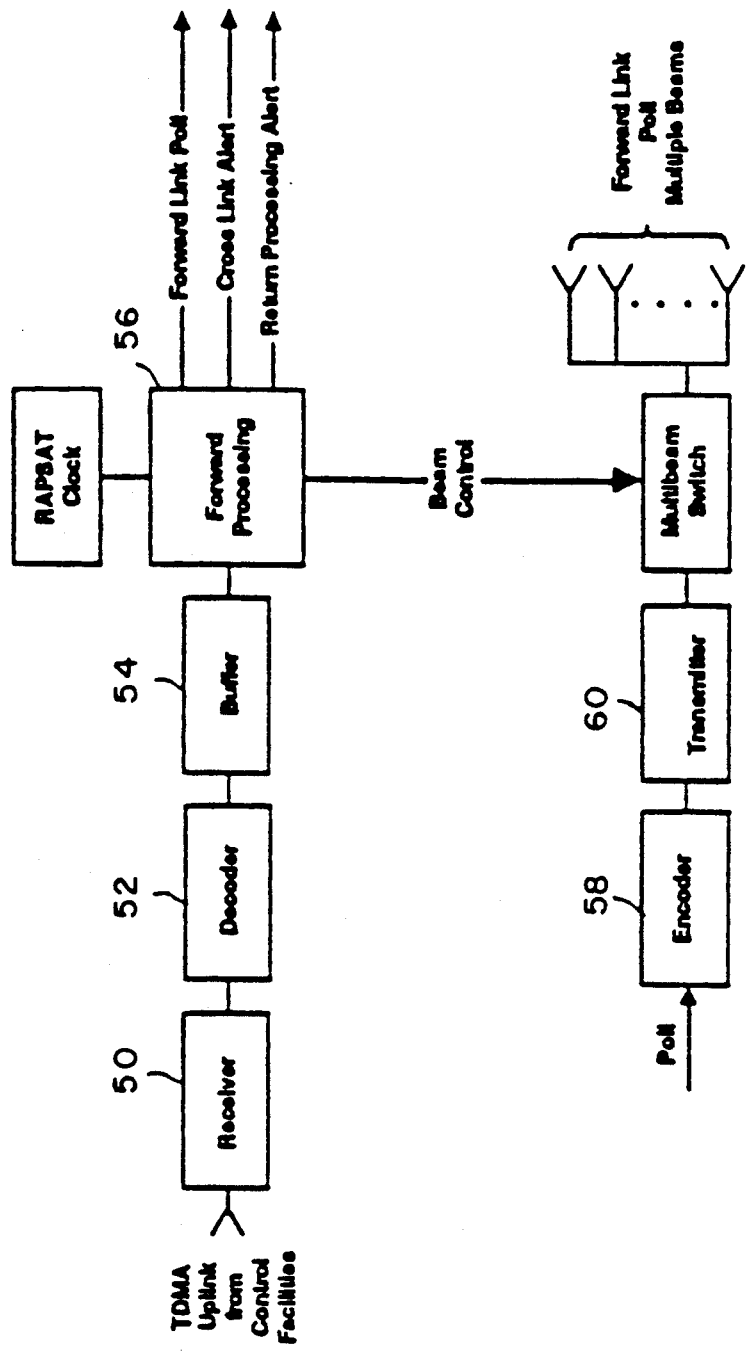
FIG. 7 is an illustrative block diagram of the RAPSAT forward link.

FIG. 7 is an exemplary top-level block diagram of the satellite forward functions. The receiver 50 includes an up link antenna assembly, low noise front end, down converter and demodulator. A decoder 52 digitizes and formats the demodulated poll request messages to make them suitable for digital processing. A buffer 54 stores the digitized poll request messages until they are accessed by a forward processing block 56 as described above for FIG. 6. An encoder 58 transforms the poll bit streams into a waveform that is suitable for modulating the carrier. A transmitter 60 contains a modulator, up converter, power amplifier and spot beam antenna assembly. Since only one poll is transmitted at a time, the power amplifier can be operated at full power capability without generating intermodulation products, a significant advantage that is often stated for TDMA.

Figure 8:
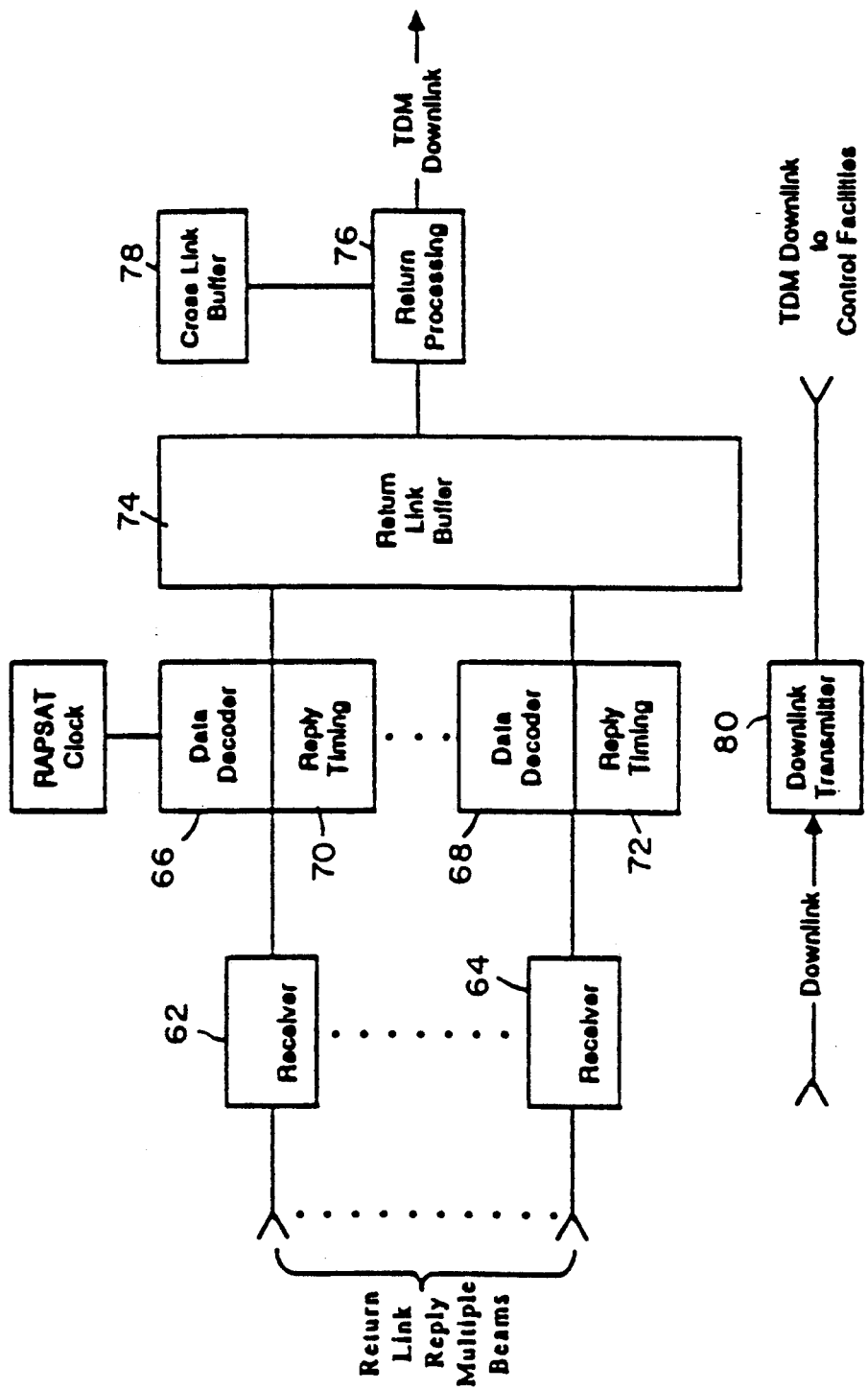
FIG. 8 is an illustrative block diagram of the RAPSAT return link.

FIG. 8 is a top-level block diagram of the satellite return functions. Receivers 62 and 64, representing multiple parallel receivers, consist of spot beam receive antenna assemblies, low noise front ends, down converters and demodulators. This figure illustrates parallel receivers in a functional sense. A common receiver can also be used with appropriate beam switching. However, the parallel approach would allow a less complicated operation since the poll transmit and reply receive functions would not have to be synchronized for receive beam switching. The data decoders 66 and 68 digitize, apply forward error correction, and format the demodulated replies into a format suitable for digital processing. The demodulated replies are also routed to reply timing blocks 70 and 72 where the reply arrival time is determined based upon the satellite time reference. A return link buffer 74 stores the digitized reply messages and arrival times until they are accessed by the return processing block 76. A cross link buffer 78 stores the digitized reply messages received from the other satellite until accessed by the return processing block 76 which has been described above in conjunction with FIG. 6. A down link consists of a down link transmitter 80 and provides a TDM stream of processed replies. Each control facility processes those replies that are of interest to it. This provides a back up capability in the event a control facility has an outage. In that case, another control facility(s) would be assigned the failed control facility's TDMA uplink slot and would receive the corresponding replies on the TDM down link.

It is thus seen that the objects of this invention have been achieved in that there has been disclosed a ranging and processing satellite system for the data link and surveillance service of mobiles from multiple control facilities. The present invention allows direct multiple access from numerous control facilities. On-board interleaving of polling messages eliminates the waste of garbling guard times which leads to high spectral efficiency. The present system also permits on-board satellite acquisition of mobiles entering the system. It is recognized that modifications and variations of the present invention will occur to those skilled in the art and it is intended that all such modifications and variations be included within the scope of the appended claims.

What is claimed is:

1. A ranging and processing satellite system for data link with and cooperative surveillance of a plurality of mobile units from multiple control facilities comprising:
   at least two satellites including means for discretely polling individual mobile units requested by one or more of the control facilities and for receiving replies from the polled mobile units, such replies including information about the mobile units' positions;
   means operable in connection with the means for polling and for receiving replies, for precluding garbling between replies to polls initiated by the at least two satellites;
   a cross-link communication path between the at least two satellites to exchange mobile ranging data;
   processing means on at least one of the satellites to store poll commands, initiate polls according to an optimal sequence that fills in the guard times between polls with other messages, store messages between mobile units and control facilities, and to compute the ranges between the mobile unit and each of the satellites from the replies from the mobile units; and
   means for transmitting the computed ranges to at least one of the control facilities.

2. The system of claim 1 wherein the means for precluding garbling includes each satellite having a directional receive antenna for receiving replies from mobile units.

3. The system of claim 1 of claim 2 wherein a first one of the satellites further includes (a) means for polling a mobile unit, recording the time the poll is transmitted, $T_{xa}$, and the time the reply is received, $T_{ra}$, and (b) the processing means is adapted to compute a first range from the elapsed time;
   wherein a second satellite includes means for receiving the reply from the mobile unit, such reply being received at a time $T_{rb}$, and means for transmitting this time $T_{rb}$ to the first satellite; and
   the first processing means on the first satellite computes the range to the mobile unit in units of time between the second satellite and the mobile unit, being $$R_b = T_{rb} - [(T_{xa} + T_{ra}/2)].$$

4. The system of claim 3 wherein the multiple control facilities employ TDMA or FDMA multiplexing to directly upload poll commands and data messages for storage by the satellite data processor.

5. The system of claim 1 wherein the mobile units are polled in ascending order of range.

6. The system of claim 1 wherein the coverage volume of the satellites is divided into subvolumes and mobile units located in separate subvolumes are alternately polled.

7. The system of claim 1 wherein one of the satellites acquires mobile units entering the system by on-board position determination through the range determinations and altitude received from the mobile units when required for position determination.

* * * * *